Oct. 27, 1970    D. A. KELLY    3,535,872
CLOSED BI-CYCLE GYROSTABILIZER TURBINE
Filed June 11, 1969    3 Sheets-Sheet 1
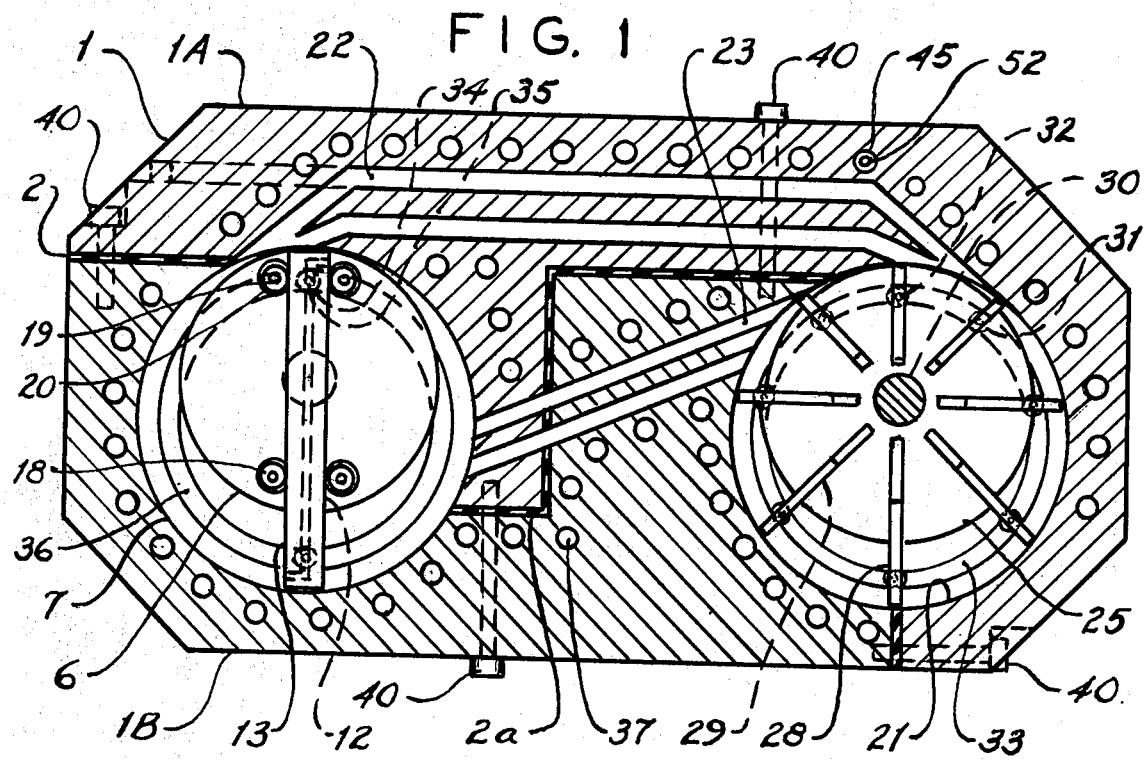
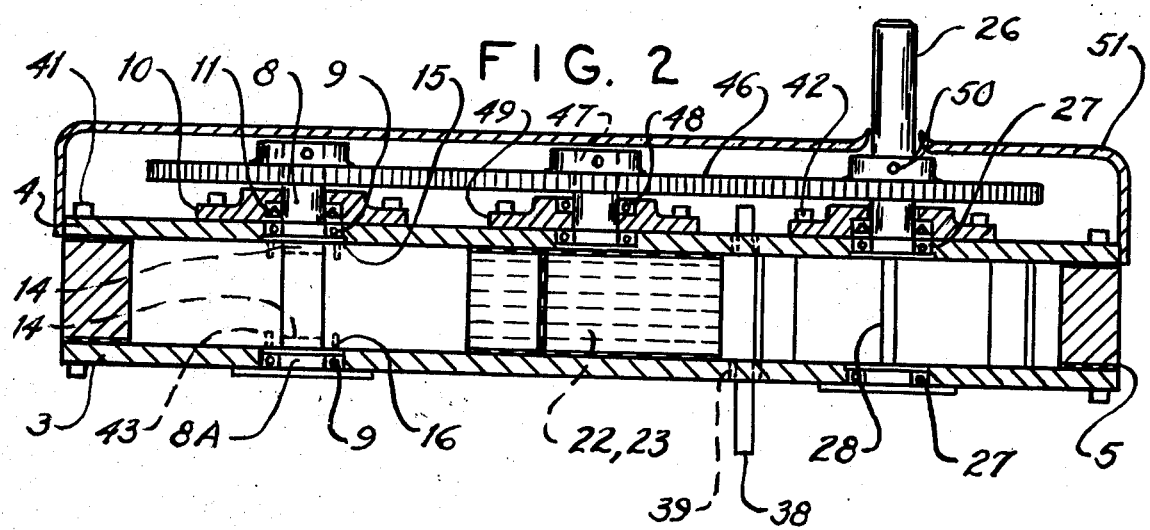
INVENTOR.
Donald A. Kelly Oct. 27, 1970  D. A. KELLY  3,535,872

CLOSED BI-CYCLE GYROSTABILIZER TURBINE

Filed June 11, 1969  3 Sheets-Sheet 2

INVENTOR.
Donald A Kelly

Oct. 27, 1970  D. A. KELLY  3,535,872
CLOSED BI-CYCLE GYROSTABILIZER TURBINE
Filed June 11, 1969  3 Sheets-Sheet 3

INVENTOR.
Donald A Kelly

United States Patent Office 3,535,872
Patented Oct. 27, 1970

3,535,872
CLOSED BI-CYCLE GYROSTABILIZER TURBINE
Donald A. Kelly, 58—06 69th Place,
Maspeth, N.Y. 11378
Filed June 11, 1969, Ser. No. 832,396
Int. Cl. F03g 7/06; F25b 9/00
U.S. Cl. 60—24
9 Claims

ABSTRACT OF THE DISCLOSURE

The closed bi-cycle gyrostabilizer turbine is advocated as a closed cycle power source in which the geometry of the rotating elements provides a gyroscopic effect for the horizontal stability of a vehicle.

The closed bi-cycle turbine is a Brayton cycle machine wherein a fixed volume of gas is cycled twice through a horizontal flow loop that enters and leaves the operating bores tangentially.

The flat, modular configuration facilitates the economical forming of the flow loop through the isolated, alternate thermal sections.

---

This disclosure relates to a modified Brayton closed cycle gyro-stabilizing type turbine in which the compressor shaft and power shaft are parallel and geared together so that they rotate in the same direction at or near the same rotational speed.

The compressor and power bores are connected by multiple small transfer bores which enter and leave them tangentially or nearly so, so that a continuous gas flow loop is established. The bi-cycle gyro turbine is arranged in modular form so that the transfer bores can pass through the alternate thermal sections conveniently, without the necessity of external ducting and connections.

The modular block is split into irregular and nearly equal volume hot and cold sections insulated from each other and arranged to establish the best possible thermal efficiency.

The basic difference between this gyro turbine and the previously disclosed bi-cycle turbine is that the diameter-to-width ratio of both operating rotors is a minimum of six-to-one and a maximum of twelve-to-one so that a gyroscopic effect is realized in operation.

The gyrostabilizing turbine is advantageous for rough terrain vehicles, tanks, high speed/light weight boats, motorcycles, GEM's and light panel trucks since it would provide a horizontal stability means and power source in one unit.

A rotor diameter-to-width ratio between six-to-one and twelve-to-one appears to be in the area of optimum effectiveness with the gyroscopic effect realized by the fairly high operating speeds. Since the vane tips do not touch the bore surface the usual friction problem at this point is not encountered.

The purpose of double or bi-cycling in the gyro turbine is to partially cancel the negative torque required to compress the cold gas in the compressor stage, and in so doing reduce the total torque loss within the gyro/turbine system. The compressor stage consists of a Ramelli type sliding vane and eccentric rotor which provides a fairly high compression factor for the compression of the cold gas. The sliding vane and rotor compress the upward flowing cold gas while the preheated and partially expanding gas from the power stage provides the positive torque to balance out the required compression torque.

The bi-cycling of the working gas is accomplished by the alternate placement of the thermal sections so that the circulating gas is twice alternately heated and cooled as it flows through the closed loop. The double cycling, in effect induces a positive turning moment in both rotary sections, which tend to offset the normal losses within both working stages.

The gyro turbine is a tangential flow or "water-wheel" type of turbine which lends itself to forming the Brayton cycle flow loop in a compact, modular form which will serve the various mobile power applications previously mentioned. Only low cost operating components are required for the gyro/turbine since it does not depend on expensive axial type aerodynamic rotor blades.

The compressor sliding vane is not sealed at the ends and along the sides and revolves at close clearance with the bore and side plates. The compressor vane is guided by side ball bearings which revolve in circular grooves within the side plates. The vane is also supported by eight ball bearings within the rotor to minimize friction as the vane slides back and forth within the rotor slot.

The vanes of the power section are also guided in a similar manner to that of the compressor section, and revolve at close clearance to the bore and side plates. The two sections, hot and cold, are completely insulated from each other by high temperature gaskets, so that a minimum of thermal loss occurs between them.

For convenience in manufacturing the two operating bores and the hot and cold transfer bores would be machined into the single block before the separation cuts are made. The starting points of the transfer bores are plugged from the outside so that the gas flow loop is closed and sealed. This method of construction would simplify the machining requirements and reduce costs without any sacrifice in the bi-cycle efficiency.

The compressor vane is provided with zig-zag regenerator bores for efficient thermal storage between the thermal halves. Inlet ports would be located at one extremity of each bore on the face of the vane, and outlet parts on the opposite extreme end, so that effective transfer from one thermal half to the same half is maintained.

The regenerator bores are fitted with regenerative filament to implement heat storage while minimizing gas flow resistance. In operation, the filament would pick up and store heat as the compressor vane sweeps into the hot section, and releases it just as the vane enters the hot section. It must be noted that the total length of the zig-zag regenerator bores must be equal to half the vane arc circumference, so that the proper thermal phasing is maintained.

The gyroturbine, as a closed cycle machine, must be provided with high temperature dry film lubricant on rotating surfaces, and low friction shaft seals to minimize operating drag.

The two shafts of the two operating stages are connected by three equal diameter spur gears so that the necessary same direction of rotation is obtained. The center idler gear is supported by two ball bearings within a support flange secured to the bottom plate. The two shafts must be sealed on the outside of the bearings with special low-friction seals which are mounted in flanges secured to the bottom plate.

A cover housing protects the gearing and bearings from dirt and contamination and is secured to the bottom plate.

Variations may be made in the shape of the separation cuts to suit the thermal requirements of each of the operating sections. The shape of the cut must be such that the two sections can be readily assembled with no difficulty in the effectiveness of the insulating gaskets.

The multiple transfer bores connecting the two stage bores are large in number and small in diameter so that heat may be rapidly transferred to and from them. The transfer bores may be zig-zagged to aid in heat transfer, but must be of smooth surface so that the gas flow is not impeded.

The transfer bores may be fitted with thin fin strips to provide a greater heat transfer surface if necessary.

The transfer bores may be increased in length to enhance heat transfer, and are not dependent on the operating bore sizes, but are limited by the overall module size. The transfer bores enter and leave the operating bores tangentially for smooth gas flow and transfer effectiveness.

Multiple heating bores are provided within the hot block for effective heating and these are uniformly arranged at right angles to the multiple transfer bores. Burner nozzles are placed within the heating bores and these connected with the fuel supply. The burners are set to provide low toxic level emissions, in support of anti-air pollution requirements. The fuel used may be kerosene, fuel oil or other suitable liquid fuels.

Cooling for the turbine cold section would be provided by a circulating liquid cooling system.

It is an object of the invention to provide a gyrostabilizing closed cycle turbine for horizontal stability in many vehicular applications.

It is an object of the invention to produce an efficient closed-cycle turbine for anti-air pollution effectiveness.

It is a final object of the invention to achieve a low-cost gyro/turbine utilizing a minimum of operating parts which are low in cost.

It should be understood that variations may be made in the detail design without departing from the spirit and scope of the invention. Referring to the drawings:

FIG. 1 is a plan view of the bi-cycle gyrostabilizer turbine.

FIG. 2 is an elevation view of the bi-cycle gyrostabilizer turbine.

Figure 3:
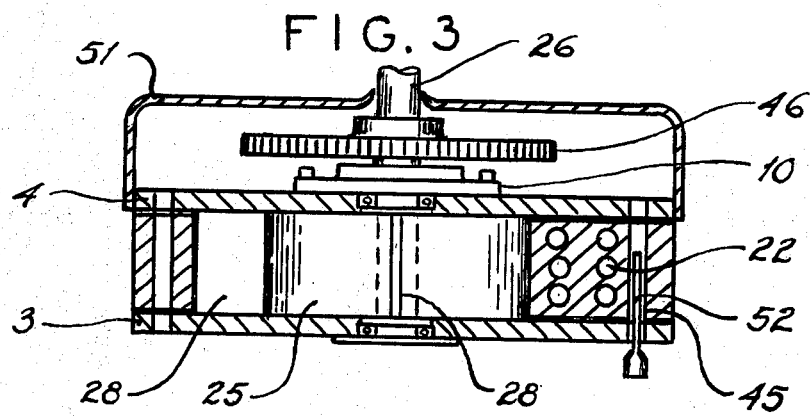
FIG. 3 is a side section view through the bi-cycle gyrostabilizer turbine.
Figure 4:
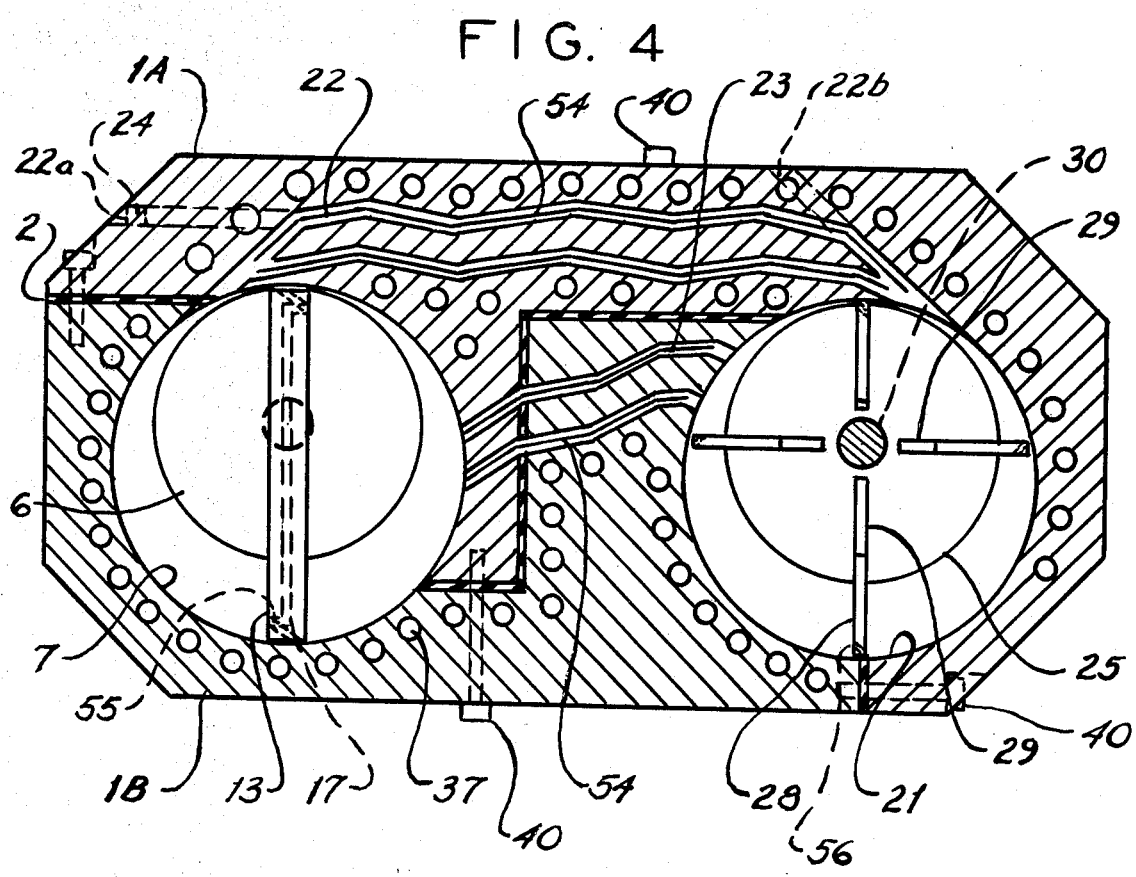
FIG. 4 is an alternate plan view of the bi-cycle gryostabilizer turbine.
Figure 5:
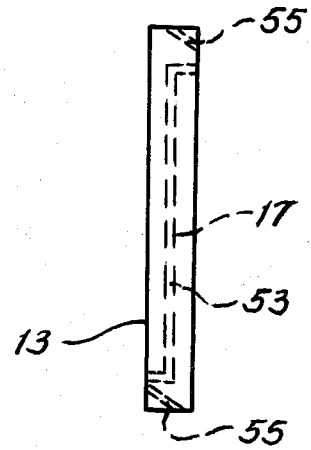
FIG. 5 is a section view through the compressor vane.
Figure 6:
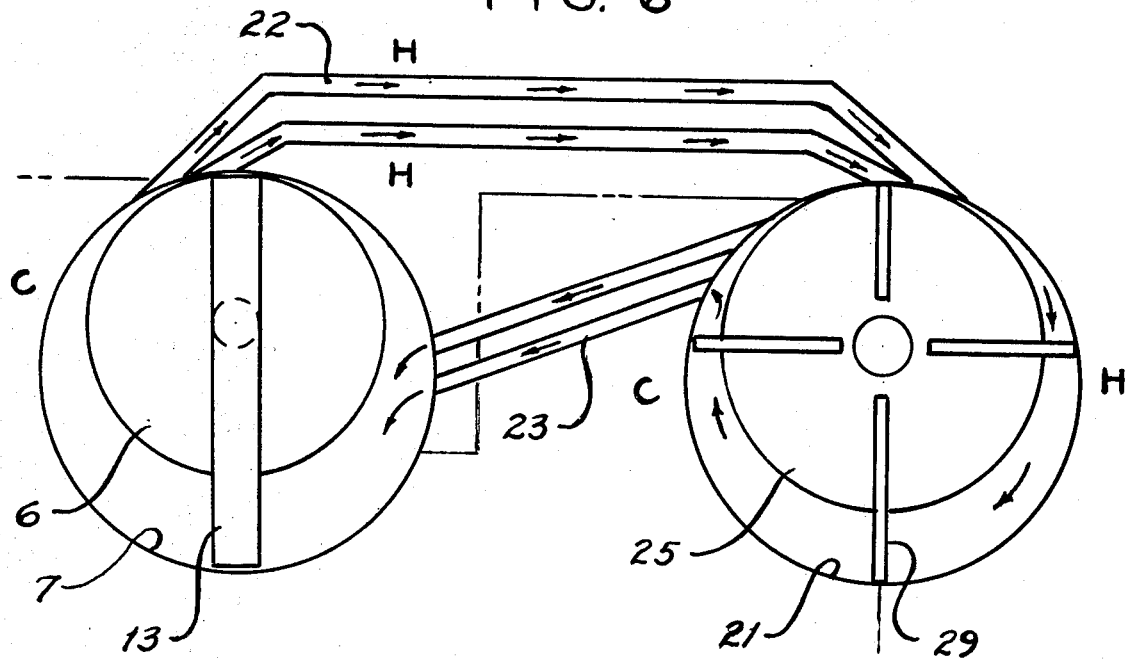
FIG. 6 is a schematic of the bi-cycle gyrostabilizer turbine.

Referring to the drawings in detail:

The modular block 1 is divided into two sections, one hot section 1A and a cold section 1B, which are nearly equal in volume, but different in shape. The sections are insulated from each other by the insulating gaskets 2 and 2a, and secured with the bolts 40. The side plates 3 and 4 are secured to the modular block 1, by the screws 41 and insulated from it by the insulating gaskets 5.

The compressor rotor 6 closely fits and revolves in the compressor bore 7, which is equally placed between the hot section 1A and the cold section 1B. The compressor rotor 6 is supported by the shafts 8 and 8A, and the two bearings 9, secured within the side plates 3 and 4.

The retaining flanges 10, carry the shaft seals 11 which pressure seal the shafts in the modular block 1.

The retaining flanges 10 are secured to the bottom plate 4 with the screws 42 with special sealant used to insure a pressure-tight seal at the joints.

The compressor rotor 6 has a diametrical slot 12 through its center which provides clearance for the sliding movement of the compressor vane 13. The slot 12 nearly divides the rotor 6 in half except for the two tie pieces 14 at both ends.

The shaft 8 has a base flange 15 which is secured to the compressor rotor 6 end by the screws 43. The shaft 8A also has a base flange 16 which is secured to the opposite end of the rotor 6 by the screws 43.

The compressor vane 13, is provided with internal regenerator bores 17 which are zig-zagged to provide the necessary flow path. The vane 13 may be split down the width in order to facilitate the machining of the regenerator bores 17.

The ball bearings 18 are recessed into the compressor rotor 6, and supported by the pins 19 within the recesses 20.

The ball bearings 18 closely guide the reciprocation of the compressor vane 13 and equally protrude into the diametrical slot 12, so that the vane 13 does not touch the slot side walls.

The power bore 21 is located adjacent to the compressor bore 7 within the modular block 1. The two operating bores 21 and 7 are connected together by the multiple transfer bores 22 and 23. The transfer bores 22 and the hot flow bore 23 are the cold flow bores. The entrance bores 22a and 22b are sealed with the threaded plugs 24. An equal number of hot and cold transfer bores 22 and 23 are required, and these do not interfere with each other when machined.

The power rotor 25 closely fits and revolves in the power bore 21 and is supported by the vertical output shaft 26 and two roller bearings 27, located in the top and bottom plates 3 and 4.

The power vanes 28 are closely fitted into the slots 29 within the power rotor 25 and are free to move radially within these slots. The power rotor 25 has a center bore 30 into which the output shaft 26 closely fits.

The power vanes 28, are guided in their radial displacement by two ball bearings 31 fixed at the vane lower sides and supported by the pins 32. The ball bearings 31 revolve in grooves 33 located on the inside faces of the top and bottom plates 3 and 4. The grooves 33 are made concentric to the power bore 21 and guide the vanes 28 at close clearance to the power bore 21 to insure maximum utilization of the expansion force.

The compressor vane 13 is also fitted with two ball bearings 34 fixed at the vane lower sides and supported by the pins 35. The ball bearings 34 revolve in the grooves 36 located on the inside faces of the top and bottom plates 3 and 4.

The cold section block 1b of the modular block 1, contain multiple liquid cooling holes 37 running through the width of the block 1b, and arrayed around the two cold half sections of the compressor bore 7 and power bore 21. A large number of coolant holes 37 must be provided consistent with the structural integrity of the cold block 1b. The entrance and exit portions of the holes 37 will be threaded to receive the connecting tubes 38 which connect to the external coolant circulating system. Clearance holes 39 will be provided in the top and bottom plates 3 and 4 for the passage of the connecting tubes 38.

The hot section block 1A is provided with multiple burner bores 45 into which the burner nozzles 52 protrude and provide the heating means. The multiple burner bores 45 are uniformly vertically disposed within the hot block 1A and are closely positional to the hot transfer bores 22.

The burner nozzles 52 are connected to a suitable fuel delivery means, and supply system.

Three spur gears 46 are secured to the shafts 8 and 26 and the idler shaft 47. This arrangement allows the two stages to rotate at the same speed and in the same direction so that the gyro/turbine functions properly.

The idler shaft 47 is supported by two ball bearings 48 and flange 49. The flange 49 is secured to the top and bottom plate 4 with the screws 42. The gears are locked to their respective shafts by the pins 50. A removable cover 51 encloses the gear assembly to provide for dirt exclusion and protect these components.

The regenerator bores 17 are provided with fine mesh regenerative filament 53, uniformly dispensed throughout their length. Interlocking thin metal strips 54, may be included within the hot and cold transfer bores 22 and 23 respectively. The interlocking thin strips 54 would increase the heat transfer surface within the bores and split the air flow into smaller cross-sections for faster heat transfer.

In the alternate arrangement the compressor vane 13 is provided with multiple tiny air pressure balancing holes 55 which serve to keep the vane ends from contacting the compressor bore 7 walls. The tiny air holes 55 in effect allows the compressor vane 13 to revolve on an air film.

The power vanes 28 would also be provided with tiny air pressure balancing holes 56 for the same purpose.

In this alternate arrangement the ball bearings 34, pins 35 in the compressor vane are not required, nor the grooves 36 in the plates 3 and 4.

What is claimed is:

1. A closed cycle gyrostabilizer turbine comprising an engine block divided into two nearly equal sections, two large vertical and parallel bores within said engine block whose diameter-to-width ratio is a minimum of six-to-one and a maximum of twelve-to-one, multiple small bore, disposed at right angles to the said two large vertical and parallel bores forming a gas flow loop, a compressor rotor eccentrically disposed in one of the said two large vertical and parallel bores, a wide diametrical slot within said compressor rotor, a wide compressor vane freely revolving and in sliding association with the said compressor rotor, multiple non-linear regenerator bores uniformly disposed within the said wide compressor vane, two flanged vertical shafts disposed at each end of the said compressor rotor and supported by bearings eccentrically placed in one of the said two large vertical and parallel bores, a power rotor eccentrically placed in the other of the said two large vertical and parallel bores, multiple radial slots and a through center bore disposed within the said power rotor, multiple power vanes in sliding association with the said radial slots of the said power rotor, a vertical output shaft secured within the said through center bore of the said power rotor and supported by bearings eccentrically disposed in the other of the said two large vertical and parallel bores, a top and bottom plate secured to the said engine block, gaskets disposed between the said top and bottom plate and the said engine block, sealing means disposed within the said bottom plate where the said vertical shafts protrude from the said engine block.

2. A closed cycle gyrostabilizer turbine according to claim 1, in which one of the two nearly equal sections of the said engine block contains multiple vertical cooling holes uniformly disposed about the said multiple small bores forming a gas flow loop.

3. A closed cycle gyrostabilizer turbine according to claim 1, in which the other of the said two nearly equal sections of the said engine block contains multiple vertical heating holes uniformly disposed about the said multiple small bores forming a gas flow loop.

4. A closed cycle gyrostabilizer turbine according to claim 1, wherein the said wide compressor vane is provided with multiple tiny holes angularly disposed from the ends to the faces of the said compressor vane, the said multiple power vanes are provided with multiple tiny holes angularly disposed from the ends to the faces of the said multiple power vanes.

5. A closed cycle gyrostabilizer turbine according to claim 1, in which the said multiple non-linear regenerator bores uniformly disposed within the said wide compressor vane are nearly equal in length to one-half the circumference of the revolving said wide compressor vane length, multiple ports corresponding to and intersecting the said regenerator bores uniformly disposed on the face near one end of the said wide compressor vane.

6. A closed cycle gyrostabilizer turbine according to claim 1, in which the said multiple small bores disposed at right angles to the said two large vertical and parallel bores are fitted with multiple interlocking thin metal strips along the length of the said multiple small bores.

7. A closed cycle gyrostabilizer turbine according to claim 1, in which the said vertical shafts protruding from the said engine block are each provided with a large spur gear, a third spur gear meshing with the two side spur gears and supported by an idler shaft mounted on the said bottom plate, a cover disposed over the said gear assembly and secured to the said bottom plate.

8. A closed cycle gyrostabilizer turbine according to claim 1 wherein the said engine block is provided with thermal insulating means between the said two nearly equal sections.

9. A closed cycle gyrostabilizer turbine according to claim 1, wherein one of the two nearly equal sections of the said engine block is fitted with multiple low-emission burners disposed within the said multiple vertical heating holes.

References Cited
UNITED STATES PATENTS

| | | | |
|---|---|---|---|
| 3,370,418 | 2/1968 | Kelly | 60—24 |
| 3,492,818 | 2/1970 | Kelly | 60—24 |

MARTIN P. SCHWADRON, Primary Examiner

R. R. BUNEVICH, Assistant Examiner

U.S. Cl. X.R.

62—6